(12) United States Patent
Irifune

(10) Patent No.: US 7,414,096 B2
(45) Date of Patent: Aug. 19, 2008

(54) SOLVENT-FREE SILICONE COMPOSITION FOR RELEASE PAPER

(75) Inventor: Shinji Irifune, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 85 days.

(21) Appl. No.: 11/602,369

(22) Filed: Nov. 21, 2006

(65) Prior Publication Data

US 2007/0129507 A1 Jun. 7, 2007

(30) Foreign Application Priority Data

Nov. 22, 2005 (JP) ............................. 2005-337761
Nov. 16, 2006 (JP) ............................. 2006-310330

(51) Int. Cl.
*C08L 83/04* (2006.01)
(52) U.S. Cl. ...................................... 525/478; 525/477
(58) Field of Classification Search ................. 525/477, 525/478
See application file for complete search history.

(56) References Cited

U.S. PATENT DOCUMENTS

| | | | | | |
|---|---|---|---|---|---|
| 3,425,967 | A | * | 2/1969 | Modic | 521/123 |
| 3,922,443 | A | * | 11/1975 | Brown et al. | 428/447 |
| 4,057,596 | A | * | 11/1977 | Takamizawa et al. | 525/475 |
| 4,071,644 | A | * | 1/1978 | Grenoble | 427/302 |
| 4,293,671 | A | * | 10/1981 | Sasaki et al. | 525/478 |
| 4,806,391 | A | * | 2/1989 | Shorin | 427/288 |
| 5,190,827 | A | * | 3/1993 | Lin | 428/447 |
| 5,204,437 | A | * | 4/1993 | Ikeno et al. | 528/15 |
| 5,292,586 | A | * | 3/1994 | Lin et al. | 428/355 R |
| 5,366,809 | A | * | 11/1994 | Schmidt et al. | 428/447 |
| 5,399,614 | A | * | 3/1995 | Lin et al. | 524/588 |
| 5,468,828 | A | * | 11/1995 | Hurford et al. | 528/15 |
| 5,519,082 | A | * | 5/1996 | Yoshino | 524/493 |
| 6,077,611 | A | * | 6/2000 | Griswold et al. | 428/423.3 |
| 6,121,368 | A | * | 9/2000 | Heying et al. | 524/493 |
| 6,201,055 | B1 | * | 3/2001 | Lutz et al. | 524/493 |
| 6,328,682 | B1 | * | 12/2001 | Shudo | 492/56 |
| 6,387,487 | B1 | * | 5/2002 | Greenberg et al. | 428/355 R |
| 6,696,161 | B2 | * | 2/2004 | Irifune et al. | 428/447 |
| 6,794,444 | B2 | * | 9/2004 | Yamamoto et al. | 524/588 |
| 7,049,375 | B2 | * | 5/2006 | Meguriya | 525/477 |
| 7,128,977 | B2 | * | 10/2006 | Yamamoto et al. | 428/447 |
| 2003/0035965 | A1 | * | 2/2003 | Irifune et al. | 428/447 |
| 2003/0134131 | A1 | * | 7/2003 | Yamamoto et al. | 428/447 |

FOREIGN PATENT DOCUMENTS

| | | |
|---|---|---|
| JP | 49-47426 | 5/1974 |
| JP | 50-141591 | 11/1975 |
| JP | 52-39791 | 10/1977 |
| JP | 57-77395 A | 5/1982 |

\* cited by examiner

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

A solvent-free silicone composition for release paper, comprising:
(A) an organopolysiloxane represented by the following average compositional formula (1)

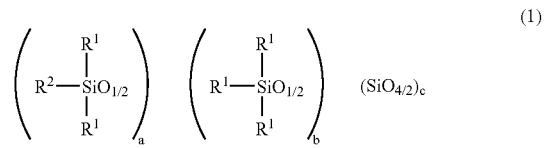

(B) an organopolysiloxane represented by the following average compositional formula (2)

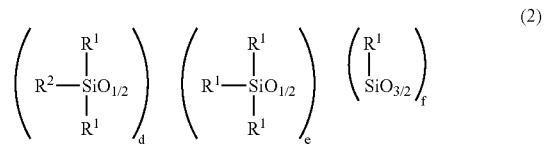

(C) an organopolysiloxane having alkenyl groups only at its ends, represented by the following formula (3)

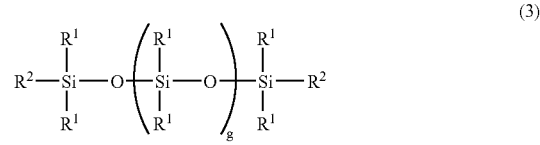

and
(D) an organohydrogenpolysiloxane represented by the following formula (4)

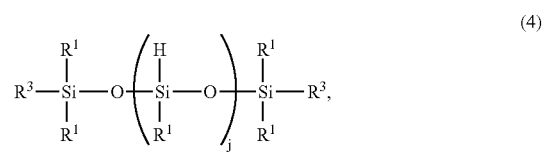

wherein the component (A) is contained in an amount of from 10 to 30 wt %, the component (B) is contained in an amount of from 10 to 30 wt %, the component (C) is contained in an amount of from 40 to 80 wt %, based on a total weight of the components (A), (B) and (C), and the component (D) is contained in such an amount that a molar ratio of the hydrogen atom or atoms bonded to a silicon atom to a total of the alkenyl groups of the components (A), (B) and (C) ranges from 1.0 to 4.0. The composition forms a tight release layer whose release force largely increases with release speed.

7 Claims, No Drawings

SOLVENT-FREE SILICONE COMPOSITION FOR RELEASE PAPER

This application claims benefit of Japanese Patent application No. 2005-337761 filed on Nov. 22, 2005 and Japanese Patent application No. 2006-310330 filed on Nov. 16, 2006, the contents of which are hereby incorporated by reference.

1. Field of the Invention

The present invention relates to a solvent-free silicone composition for release paper which forms a release layer having a large positive correlation between release force and release speed.

2. Description of the Prior Art

Release paper is used for protecting adhesive materials by preventing the adhesive materials from sticking or fixing to substrates such as paper and plastic. Various kinds of silicone compositions for preparing release paper are known and those comprising a solvent have been widely used because of good release property and wide applicability to various kinds of substrates. Recently, solvent-free type silicone compositions are preferred from safety and hygienic viewpoints and various studies on solvent-free compositions have been made.

For example, Japanese Patent Application Laid-Open No. 49-47426 discloses a coating composition mainly composed of an organopolysiloxane which can be applied to substrates such as paper and film without using a solvent.

Japanese Patent Application Laid-Open No. 50-141591 discloses a solvent-free silicone composition comprising a relatively low-molecular weight polysiloxane. It is described that the composition can form a coating layer having good releasing property and mechanical strength as high as the one attained by a higher-molecular weight polysiloxane.

Publication of Examined Japanese Patent Application No. 52-39791 discloses a solvent-free organopolysiloxane composition comprising an organopolysiloxane having vinyl groups, an organopolysiloxane having at least 3 SiH bonds per molecule, and a curing catalyst.

Japanese Patent Application Laid-Open No. 57-77395 discloses a solvent-free composition comprising a low-viscosity polysiloxane having a terminal vinyl group or silanol group, an organohydrogenpolysiloxane, and a curing catalyst.

A silicone composition for release paper is required to form a cured layer having release force suitable for its intended use. For release paper used for sandwiching a double-coated pressure sensitive adhesive tape, a silicone composition to form a light release layer and the one to form a tight release layer are required. In this context, a tight release means a force required for a release layer to be peeled from a pressure sensitive adhesive of 0.3 N/50 mm or larger. The tight release layer should have significantly larger release force than that of the light release layer even at a high release speed in order to remain attached to the adhesive during peeling the light release layer at a high speed.

Generally, two different kinds of silicone compositions are used, one for the light release layer and one for the tight release layer. A method so far employed is to use a silicone composition for the light release layer which forms a cured product having a lower degree of crosslinking. However, when this method was applied to solvent-free silicone compositions, a tight release layer did not maintain release force larger than that of a light release layer at a high release speed.

Therefore, a solvent-free silicone composition is desired which forms a tight release layer having release force which increases with release speed, that is, a tight release layer having a larger positive correlation between release force and release speed than that of a prior art composition.

SUMMARY OF THE INVENTION

The present inventor has found that a combination of a plurality of organopolysiloxanes having alkenyl groups can form a release layer, when cured with a specific organohydrogenpolysiloxane, which layer has a release force that is tight at a low release speed and largely increases with release speed.

Thus, the present invention is a solvent-free silicone composition for release paper, comprising:

(A) an organopolysiloxane represented by the following average compositional formula (1)

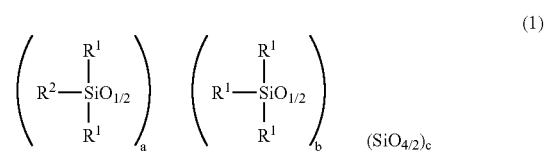

wherein $R^1$ is a substituted or unsubstituted monovalent $C_{1-10}$ hydrocarbon group which does not contain an aliphatic unsaturated bond, $R^2$ is an alkenyl group represented by the formula $-(CH_2)_p-CH=CH_2$, wherein p is an integer of from 0 to 6, the alkenyl group being contained in an amount of from 0.06 to 0.10 mole per 100 g of the organopolysiloxane (A), and a, b, and c are such numbers that a/c ranges from 0.05 to 0.2, b/c ranges from 0.5 to 1.0, and (a+b)/c ranges from 0.5 to 1.0;

(B) an organopolysiloxane represented by the following average compositional formula (2)

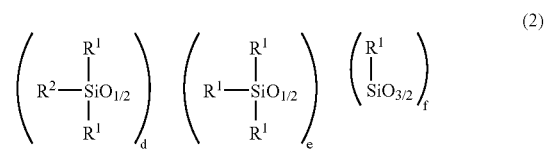

wherein $R^1$ and $R^2$ are as defined above, the alkenyl group being contained in an amount of from 0.4 to 0.7 mole per 100 g of the organopolysiloxane (B), and d, e, and f are such numbers that d/f ranges from 0.8 to 1.5, e/f ranges from 0 to 0.5, (d+e)/f ranges from 0.6 to 1.5, and a viscosity of the organopolysiloxane (B) at 25° C. ranges from 5 to 100 mPa·s;

(C) an organopolysiloxane having alkenyl groups only at its ends, represented by the following formula (3)

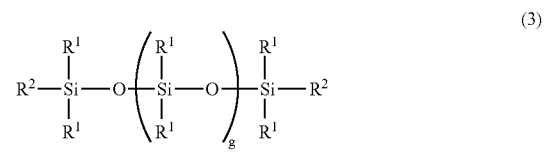

wherein $R^1$ and $R^2$ are as defined above, and g is such a number that a viscosity of the organopolysiloxane (C) at 25° C. ranges from 800 to 2000 mPa·s; and (D) an organohydrogenpolysiloxane represented by the following formula (4)

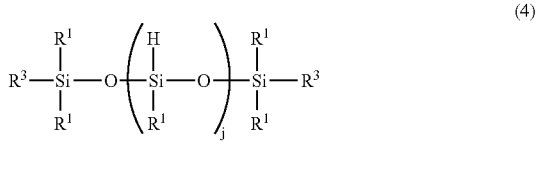

(4)

wherein $R^1$ is as defined above, $R^3$ is a hydrogen atom or the same as $R^1$, and j is an integer of from 8 to 20, wherein the component (A) is contained in an amount of from 10 to 30 wt %, the component (B) is contained in an amount of from 10 to 30 wt %, the component (C) is contained in an amount of from 40 to 80 wt %, based on a total weight of the components (A), (B) and (C), and the component (D) is contained in such an amount that a molar ratio of the hydrogen atom or atoms bonded to a silicon atom to a total of the alkenyl groups of the components (A), (B) and (C) ranges from 1.0 to 4.0.

The aforesaid present silicone composition forms a tight release layer whose release force largely increases with release speed.

PREFERRED EMBODIMENTS OF THE INVENTION

Each component of the present composition will be explained in detail.

The organopolysiloxane (A) is represented by the following average compositional formula (1):

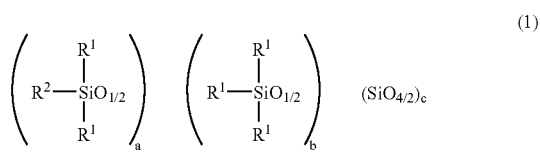

(1)

wherein $R^1$ is a substituted or unsubstituted monovalent $C_{1-10}$ hydrocarbon group which does not contain an aliphatic unsaturated bond. Examples of $R^1$ include alkyl groups such as methyl, ethyl, propyl and butyl groups; alicyclic groups such as a cyclohexyl group; aryl groups such as phenyl and tolyl groups; and partly or fully substituted groups thereof such as hydroxypropyl, cyanoethyl, 1-chloropropyl, and 3,3,3-trifluoropropyl groups. Among these, alkyl groups and aryl groups are preferred and a methyl group is particularly preferred because of good curing property of the composition and good release property of a cured product.

$R^2$ is an alkenyl group represented by the formula —$(CH_2)_p$—CH=$CH_2$, wherein p is an integer of from 0 to 6, preferably from 0 to 3. The alkenyl group is contained in Component (A) in an amount of from 0.06 to 0.10 mole, preferably from 0.07 to 0.09 mole, per 100 g of Component (A). In the formula (1), a, b, and c are such numbers that a/c ranges from 0.05 to 0.2, b/c ranges from 0.5 to 1.0, and (a+b)/c ranges from 0.5 to 1.0, preferably from 0.6 to 0.9.

Component (A) is contained in the composition in an amount of from 10 to 30 wt %, preferably from 15 to 25 wt %, based on a total weight of Components (A), (B) and (C). If Component (A) is contained in an amount below the aforesaid lower limit, sufficiently tight releasing property may not be attained. If it is contained in an amount above the aforesaid upper limit, application of a composition tends to be difficult.

The organopolysiloxane (B) is represented by the following average compositional formula (2):

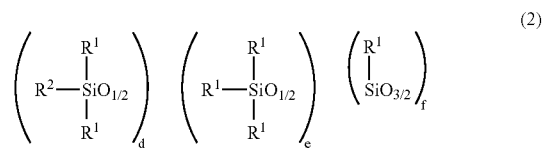

(2)

wherein $R^1$ and $R^2$ are as defined above. The alkenyl group is contained in Component (B) in an amount of from 0.4 to 0.7 mole, preferably from 0.5 to 0.6 mole, per 100 g of Component (B). In the formula (2), d, e, and f are such numbers that d/f ranges from 0.8 to 1.5, e/f ranges from 0 to 0.5 and (d+e)/f ranges from 0.6 to 1.5, preferably from 0.8 to 1.2. An organopolysiloxane whose (d+e)/f is smaller than 0.6 is difficult to prepare due to a relatively large amount of $R^2SiO_{3/2}$ unit. On the other hand, an organopolysiloxane whose (d+e)/f is larger than 1.5 may make it difficult to attain desired positive correlation between release speed and release force.

In the formula (2), d, e, and f are such numbers that Component (B) has a viscosity at 25° C. of from 5 to 100 mPa·s. If the viscosity is below the aforesaid lower limit, a composition may not be cured well. If the viscosity is above the aforesaid upper limit, a composition would have too high viscosity to handle with ease.

Component (B) is contained in the composition in an amount of from 10 to 30 wt %, preferably from 10 to 20 wt %, based on a total weight of Components (A), (B) and (C). If Component (B) is contained in an amount less than the aforesaid lower limit, release property may not be sufficiently tight at a low releasing speed. If it is contained in an amount above the aforesaid upper limit, desired positive correlation between release speed and release force may not be attained.

Component (B) can be prepared by cohydrolyzing trialkoxymethylsilane and dialkenyltetramethyldisiloxane or hexamethyldisloxane in an alcoholic solvent in the presence of an acidic catalyst; neutralizing the catalyst; removing produced alcohol; washing reaction products with water; and removing unreacted raw materials.

The organopolysiloxane (C) has alkenyl groups only at its ends and is represented by the following formula (3):

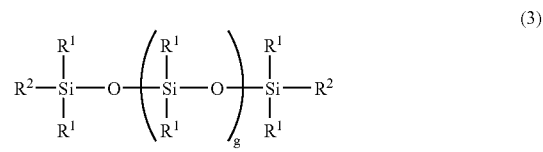

(3)

wherein $R^1$ and $R^2$ are as defined above and g is such a number that the organopolysiloxane has a viscosity of from 800 to 2000 mPa·s, preferably from 1000 to 1700 mPa·s, more preferably from 1300 to 1700 mPa·s.

If the organopolysiloxane has a viscosity smaller than the aforesaid lower limit, desired positive correlation between release speed and release force may not be attained. If it has a viscosity larger than the aforesaid upper limit, a viscosity of a composition may be impractically high to apply to a substrate with ease.

Component (C) is contained in the composition in an amount of from 40 to 80 wt %, preferably from 50 to 70 wt %, based on a total weight of Components (A), (B) and (C). If Component (C) is contained in an amount less than the aforesaid lower limit, desired positive correlation between release speed and release force may not be attained. If it is contained in an amount above the aforesaid upper limit, release property at a low release speed may not be sufficiently tight.

The organohydrogenpolysiloxane (D) is represented by the following formula (4):

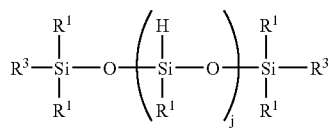
(4)

wherein $R^1$ is as defined above, $R^3$ is a hydrogen atom or the same as $R^1$, j is an integer of from 8 to 20, preferably from 8 to 15, more preferably from 8 to 12. An organohydrogenpolysiloxane having j smaller than 8 evaporates during curing process of a composition, so that a cured product may have unsatisfactory mechanical properties. If j is larger than 20, larger amount of substances may migrate from a composition to an adhesive layer. Component (D) may be a mixture of two or more of the organopolysiloxane of the formula (4).

Component (D) is contained in the composition in such an amount that a molar ratio of the hydrogen atom or atoms bonded to a silicon atom, herein after referred to as SiH groups, to a total of the alkenyl group of Components (A), (B) and (C) ranges from 1.0 to 4.0, preferably from 1.2 to 2.5. If Component (D) is contained in an amount below the aforesaid lower limit, sufficient degree of curing may not be attained. If it is contained in an amount above the aforesaid upper limit, release force tends to change with time.

The present composition may contain (E) a platinum group metal compound as a catalyst. As described later in the specification, the platinum group metal compound (E) is preferably incorporated in the composition just before curing the composition. Therefore, the present invention includes a composition in the form of separate packages of the aforesaid components (A) to (D) and the component (E).

Examples of the platinum group metal compound include platinum, palladium, rhodium and ruthenium catalysts, among which platinum catalysts are preferred. Examples of the platinum catalysts include chloroplatinic acid, alcohol or aldehyde solutions of chloroplatinic acid, complexes of chloroplatinic acid with an olefin compound or vinylsiloxane. The platinum metal group catalyst is used in a catalytic amount, typically, of from 10 to 1000 ppm, preferably from 50 to 200 ppm, as platinum metal, based on a total weight of Components (A), (B), (C) and (D) from the economical viewpoint.

Preferably, the present composition comprises (F) a reaction retarder for suppressing catalytic activity of the aforesaid platinum metal catalyst, for example, organic nitrogen compound, organic phosphorous compounds, acetylenic compounds, oxime compounds, and organic chromium compounds. The reaction retarder is incorporated in the composition in an amount not to adversely affect the present invention.

Examples of the reaction retarder include acetylenic alcohols such as 3-methyl-1-butyne-3-ol, 3,5-dimethyl-1-hexyne-3-ol, and 3-methyl-1-pentyne-3-ol, and phenylbutynol; acetylenic compounds such as ethynylcyclohexanol, 3-methyl-3-pentene-1-yene and 3,5-dimethyl-1-hexyne-3-yene; reaction products of these acetylenic compounds with alkoxysilane, siloxane, or hydrogensilane; vinylsiloxane such as cyclic tetramethylviylsiloxane; organic nitrogen compounds such as benzotriazole; organic phosphorous compounds, oxime compounds and organic chromium compounds.

Component (F) may be contained in the composition in such an amount that a desired viscosity of the composition is maintained. Generally, it is contained in an amount of from 0.01 to 10 wt %, preferably from 0.05 to 5 wt %, based on a total weight of components (A) to (E).

The present composition may comprise optional components such as stabilizers, heat resistance improver, filler, pigments, leveling agents, adhesion aids, antistatic agents, antifoaming agents, and non-reactive organopolysiloxane.

The present composition can be prepared by mixing aforesaid components with a known means of mixing such as a planetary mixer at room temperature. Preferably, the catalyst (E) is mixed with other components just before coating the composition.

The present composition has a viscosity of from 50 to 1000 mPa·s, preferably from 100 to 800 mPa·s at 25° C. A composition having a viscosity below the aforesaid lower limit may not achieve a desired positive correlation, and a composition having a viscosity above the aforesaid upper limit may be difficult to apply to a substrate. For the composition comprising the platinum metal compound (E), initial viscosity, i.e., a viscosity just after adding the component (E) to other components, is in the aforesaid range, because a viscosity gradually increases due to a reaction. To maintain the initial viscosity, the component (F) is added.

The present composition can be applied to various substrates to manufacture release layer such as paper, sheets or labels. Examples of the substrates include paper such as glassine paper, craft paper, clay coated paper; laminated paper such as polyethylene-laminated paper, and polyethylene-laminated craft paper; plastic films or sheets such as polyester, polypropylene, polyethylene, polyvinylchloride, polytetrafluoroethylene, and polyimide films or sheets; and metal foils such as aluminum foil.

To apply the present composition, any known methods can be used, for example, role coating, gravure coating, Wire-bar coating, air knife coating, and dipping. An amount to be applied ranges from 0.01 to 100 g/m². The applied coating typically has a thickness of from 0.1 to 10 μm. The composition is applied to an entire surface or required parts of the substrate. The applied silicone composition is cured at a temperature of from 50 to 200° C. for 1 second to 5 minutes.

EXAMPLES

The present invention will be explained in detail below with reference to the Examples, but not limited thereto.

Example 1

Twenty parts by weight of the organopolysiloxane A-1 which is represented by the following formula and has an alkenyl content of 0.08 mol/100 g,

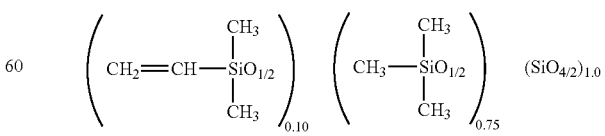

10 parts by weight of the organopolysiloxane B-1 which is represented by the following formula and has an alkenyl content of 0.58 mol/100 g,

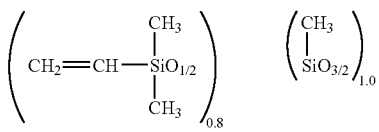

70 parts by weight of the organopolysiloxane C-1 which has a viscosity of 1500 mPa·s at 25° C. and an alkenyl content of 0.01 mol/100 g, and is represented by the following formula,

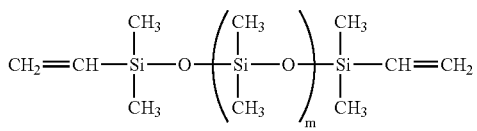

wherein m is about 250 on average, the methylhydrogenpolysiloxane D-1 in an amount of 9.1 parts by weight, which amount corresponds to a molar ratio of SiH groups to a total of the alkenyl groups of the components (A) to (C) of 1.4,

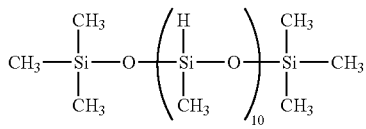

and 0.3 part by weight of ethynylcyclohexanol were thoroughly mixed. To 100 parts by weight of the mixture obtained, 2 parts by weight of chloroplatinic acid complex with vinylsiloxane (100 ppm as platinum metal) was added, whereby silicone composition 1 was obtained. The silicone composition 1 had a viscosity of 680 mPa·s. In the Examples, viscosity was measured immediately after a composition was prepared at 25° C.

Example 2

Silicon composition 2 was prepared in the same manner as in Example 1 except that 20 parts by weight of the organopolysiloxane B-1, 60 parts by weight of the organopolysiloxane C-1, and the methylhydrogenpolysiloxane D-1 in an amount of 15.5 parts by weight, which amount corresponds to a molar ratio of SiH groups to a total of the alkenyl groups of the components (A) to (C) of 1.4, were used. The silicone composition 2 had a viscosity of 410 mPa·s.

Example 3

Silicon composition 3 was prepared in the same manner as in Example 2 except that the methylhydrogenpolysiloxane D-1 was used in an amount of 19.95 parts by weight, which amount corresponds to a molar ratio of SiH groups to a total of the alkenyl groups of the components (A) to (C) of 1.8. The silicone composition 3 had a viscosity of 360 mPa·s.

Comparative Example 1

Silicon composition 4 was prepared in the same manner as in Example 1 except that 40 parts by weight of the organopolysiloxane A-1, 60 parts by weight of the organopolysiloxane C-1, the methylhydrogenpolysiloxane D-1 in an amount of 5.5 parts by weight, which amount corresponds to a molar ratio of SiH groups to a total of the alkenyl groups of the components (A) and (C) of 1.8, were used and the organopolysiloxane B-1 was not used. The silicone composition 4 had a viscosity of 1050 mPa·s.

Comparative Example 2

Silicon composition 5 was prepared in the same manner as in Example 1 except that 30 parts by weight of the organopolysiloxane B-1, 70 parts by weight of the organopolysiloxane C-1, the methylhydrogenpolysiloxane D-1 in an amount of 26.0 parts by weight, which amount corresponds to a molar ratio of SiH groups to a total of the alkenyl groups of the components (B) and (C) of 1.8 were used and the organopolysiloxane A-1 was not used. The silicone composition 5 had a viscosity of 200 mPa·s.

Comparative Example 3

Silicon composition 6 was prepared in the same manner as in Example 1 except that 100 parts by weight of the organopolysiloxane C-1, and the methylhydrogenpolysiloxane D-1 in an amount of 1.5 parts by weight, which amount corresponds to a molar ratio of SiH groups to the alkenyl groups of the component (C) of 1.8, were used and both of the organopolysiloxane A-1 and the organopolysiloxane B-1 were not used. The silicone composition 6 had a viscosity of 1300 mPa·s.

Comparative Example 4

Silicon composition 7 was prepared in the same manner as in Example 3 except that, in place of the organopolysiloxane C-1, 60 parts by weight of the organopolysiloxane C-2 which has a viscosity of 600 mPa·s at 25° C. and an alkenyl content of 0.015 mol/100 g was used. The silicone composition 7 had a viscosity of 210 mPa·s.

Comparative Example 5

Silicon composition 8 was prepared in the same manner as in Example 3 except that, in place of the methylhydrogenpolysiloxane D-1, 20.3 parts by weight of the methylhydrogenpolysiloxane D-2 represented by the following formula was used.

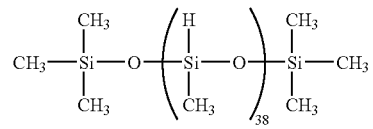

The silicone composition 8 had a viscosity of 480 mPa·s.

Each composition obtained was evaluated by the following methods.

Curing of Silicone Composition

Immediately after preparing each composition, the composition was applied to a polyethylene layer laminated on paper in an amount of 0.6 to 0.8 g/m², which is then heated at a temperature of 120° C. for 60 seconds in a hot-air dryer. The release paper thus obtained, hereinafter referred to as a silicone separator, was evaluated by the following methods.

Release Force at a Low Release Speed

A silicone separator prepared by the aforesaid method was kept at 50° C. for 3 days. On the silicone coated surface of the separator, an adhesive layer of a double-coated adhesive tape No. 502, ex NITTO DENKO Co., was attached, from which a 5 cm×23 cm test piece was cut out. The test piece was sandwiched between two glass plates, which was kept at 70° C. for 20 hours with a load of 70 g/cm² applied thereon. After removing the glass plates, the test piece was subjected to 180-degree peel test with a tensile testing machine. A force (N/50 mm) required to peel the adhesive layer of the double-coated adhesive tape from the separator at a pulling speed of 0.3 m/min was measured.

Release Force at a High Release Speed

The release force was measured in the same manner as described above except that a pulling rate was 60 m/min.

Ratio of Release Force

A ratio of the release force measured at 60 m/min to the one at 0.3 m/min was calculated according to the following equation:

Ratio of Release force=Release force at 60 m/min/Release force at 0.3 m/min

The higher the ratio is, the larger is positive correlation between release force and release speed.

Subsequent Adhesion

On the silicone coated surface of a silicone separator prepared by the aforesaid method, a polyester tape, Nitto 31B, ex NITTO DENKO Co., was attached and kept at 70° C. for 20 hours with a load of 1976 Pa applied thereon. After cooling the separator to room temperature, the polyester tape was peeled off from the separator and stuck again to a stainless steel plate. A force required to peel the polyester tape from the stainless steel plate, herein after referred to as Force (I), was measured in the same manner as in the measurement of the release force.

Control test was run in the same manner as described above except that a polytetrafluoroethylene plate was used in place of the silicone separator. A force required to peel the polyester tape from the stainless steel plate, herein after referred to as Force (II), was measured by the aforesaid method. From Force (I) and (II), subsequent adhesion in percentage was calculated according to the following equation:

Subsequent adhesion (%)=[Force (I)/Force (II)]×100

Migration

A 25 μm-thick PET film was attached to a silicone separator prepared by the aforesaid method. The test piece thus obtained was allowed to stand for 20 hours with a load of 150 kg/cm² applied thereon. After peeling the PET film from the separator, the surface of the PET film which had been in contact with the separator was subjected to a quantitative analysis of Si by X-Ray fluorescence analysis. The smaller count means less migration.

TABLE 1

|  | Viscosity (mPa·s) | Migration (Kcps) | Subsequent adhesion (%) | Release force @0.3 m/min (N/50 mm) | Release force @60 m/min (N/50 mm) | Ratio of release force |
|---|---|---|---|---|---|---|
| Example 1 | 680 | 0.06 | 100 | 0.2 | 2.5 | 12.5 |
| Example 2 | 410 | 0.06 | 99 | 0.2 | 2.8 | 14.0 |
| Example 3 | 360 | 0.06 | 100 | 0.2 | 2.9 | 14.5 |
| Comparative Example 1 | 1050 | 0.15 | 92 | 0.5 | 2.3 | 4.6 |
| Comparative Example 2 | 200 | 0.04 | 100 | 0.5 | 1.8 | 3.6 |
| Comparative Example 3 | 800 | 0.04 | 98 | 0.1 | 0.9 | 9.0 |
| Comparative Example 4 | 210 | 0.06 | 98 | 0.3 | 1.7 | 5.7 |
| Comparative Example 5 | 480 | 0.15 | 87 | 0.3 | 1.9 | 6.3 |

As shown in Table 1, the compositions of Examples have larger ratios of release force than those of Comparative Examples. Therefore, the present composition is suitably used for tight release paper such as the one used for a double-coated adhesive tape.

The invention claimed is:

1. A solvent-free silicone composition for release paper, comprising:

(A) an organopolysiloxane represented by the following average compositional formula (1)

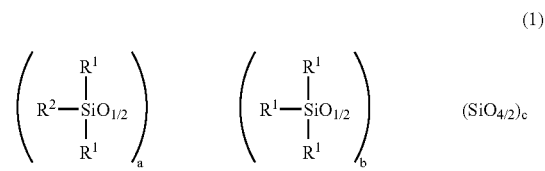

wherein $R^1$ is a substituted or unsubstituted monovalent $C_{1-10}$ hydrocarbon group which does not contain an aliphatic unsaturated bond, $R^2$ is an alkenyl group represented by the formula $—(CH_2)_p—CH=CH_2$, wherein p is an integer of from 0 to 6, the alkenyl group being contained in an amount of from 0.06 to 0.10 mole per 100 g of the organopolysiloxane (A), and a, b, and c are such numbers that a/c ranges from 0.05 to 0.2, b/c ranges from 0.5 to 1.0, and (a+b)/c ranges from 0.5 to 1.0;

(B) an organopolysiloxane represented by the following average compositional formula (2)

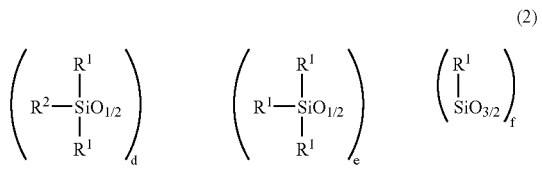
(2)

wherein $R^1$ and $R^2$ are as defined above, the alkenyl group being contained in an amount of from 0.4 to 0.7 mole per 100 g of the organopolysiloxane (B), and d, e, and f are such numbers that d/f ranges from 0.8 to 1.5, e/f ranges from 0 to 0.5, (d+e)/f ranges from 0.6 to 1.5, and a viscosity of the organopolysiloxane (B) at 25° C. ranges from 5 to 100 mPa·s;

(C) an organopolysiloxane having alkenyl groups only at its ends, represented by the following formula (3)

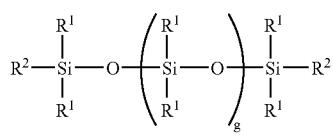
(3)

wherein $R^1$ and $R^2$ are as defined above, and g is such a number that a viscosity of the organopolysiloxane (C) at 25° C. ranges from 800 to 2000 mPa·s; and (D) an organohydrogenpolysiloxane represented by the following formula (4)

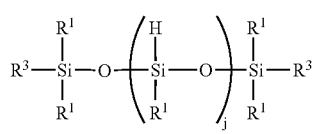
(4)

wherein $R^1$ is as defined above, $R^3$ is a hydrogen atom or the same as $R^1$, and j is an integer of from 8 to 20, wherein the component (A) is contained in an amount of from 10 to 30 wt %, the component (B) is contained in an amount of from 10 to 30 wt %, the component (C) is contained in an amount of from 40 to 80 wt %, based on a total weight of the components (A), (B) and (C), and the component (D) is contained in such an amount that a molar ratio of the hydrogen atom or atoms bonded to a silicon atom to a total of the alkenyl groups of the components (A), (B) and (C) ranges from 1.0 to 4.0.

2. The solvent-free silicone composition for release paper according to claim 1, wherein the composition further comprises a catalytic amount of (E) a compound of a platinum group metal.

3. The solvent-free silicone composition for release paper according to claim 2, wherein the composition further comprises (F) a reaction retarder in an amount of from 0.01 to 10 wt % based on a total weight of the components (A) to (E).

4. The solvent-free silicone composition for release paper according to claim 1, wherein the alkenyl group is contained in an amount of from 0.07 to 0.09 mole per 100 g of the component (A) and in an amount of from 0.5 to 0.6 mole per 100 g of the component (B).

5. The solvent-free silicone composition for release paper according to claim 1, wherein the component (C) has a viscosity at 25° C. of from 1000 to 1700 mPa·s.

6. The solvent-free silicone composition for release paper according to claim 1, wherein the component (D) is an organopolysiloxane represented by the above formula (4) with j ranging from 8 to 15, and is contained in such an amount that a molar ratio of the hydrogen atom or atoms bonded to a silicon atom to a total of the alkenyl groups of the components (A), (B) and (C) ranges from 1.2 to 2.5.

7. The solvent-free silicone composition for release paper according to claim 1, wherein the composition has a viscosity at 25° C. of from 50 to 1000 mPa·s.

* * * * *